United States Patent
Edwards et al.

(10) Patent No.: US 12,456,123 B2
(45) Date of Patent: *Oct. 28, 2025

(54) USING AUGMENTED REALITY DATA AS PART OF A FRAUD DETECTION PROCESS

(71) Applicant: Capital One Services, LLC, McLean, VA (US)

(72) Inventors: Joshua Edwards, Philadelphia, PA (US); Eric Loucks, Tysons, VA (US); Jacob Learned, Brooklyn, NY (US)

(73) Assignee: Capital One Services, LLC, McLean, VA (US)

( * ) Notice: Subject to any disclaimer, the term of this patent is extended or adjusted under 35 U.S.C. 154(b) by 121 days.

This patent is subject to a terminal disclaimer.

(21) Appl. No.: 18/387,628

(22) Filed: Nov. 7, 2023

(65) Prior Publication Data

US 2024/0070675 A1 Feb. 29, 2024

Related U.S. Application Data

(63) Continuation of application No. 16/918,730, filed on Jul. 1, 2020, now Pat. No. 11,854,014.

(51) Int. Cl.
  *G06Q 20/40* (2012.01)
(52) U.S. Cl.
  CPC ..... *G06Q 20/4016* (2013.01); *G06Q 20/4014* (2013.01); *G06Q 20/4015* (2020.05)
(58) Field of Classification Search
  CPC .................................................. G06Q 20/4016
  See application file for complete search history.

(56) References Cited

U.S. PATENT DOCUMENTS

| | | | |
|---|---|---|---|
| 9,137,500 B1 | 9/2015 | Wachman et al. | |
| 10,223,710 B2 | 3/2019 | Purves et al. | |
| 11,157,907 B1* | 10/2021 | Kumar | G06Q 20/206 |
| 11,205,212 B1* | 12/2021 | Iacono | G06Q 30/0641 |
| 11,381,784 B1* | 7/2022 | Siminoff | H04M 11/025 |
| 2010/0114617 A1 | 5/2010 | Bobbitt et al. | |
| 2018/0150831 A1 | 5/2018 | Dolan et al. | |
| 2018/0158063 A1 | 6/2018 | Jamtgaard et al. | |
| 2019/0066142 A1 | 2/2019 | Soon-Shiong | |
| 2019/0245897 A1* | 8/2019 | Calloway | H04N 21/4223 |
| 2020/0401853 A1* | 12/2020 | Xiong | G06T 7/70 |
| 2021/0097540 A1* | 4/2021 | Sumpter | G07F 19/207 |
| 2021/0201029 A1* | 7/2021 | Ju | G06Q 20/12 |
| 2021/0383392 A1* | 12/2021 | Edwards | G01C 21/20 |

FOREIGN PATENT DOCUMENTS

JP  2015135672 A  7/2015

* cited by examiner

*Primary Examiner* — Jay Huang
(74) *Attorney, Agent, or Firm* — Banner & Witcoff, Ltd.

(57) ABSTRACT

A fraud detection system may identify a suspected fraudulent transaction based on one or more criteria. The transaction may be associated with a user. Based on identifying a suspected fraudulent transaction, the fraud detection system may receive augmented reality data from an augmented reality device of the user. The fraud detection system may determine, based on the augmented reality data, whether the transaction is fraudulent, and may take an action based on the determination.

20 Claims, 6 Drawing Sheets

USING AUGMENTED REALITY DATA AS PART OF A FRAUD DETECTION PROCESS

CROSS-REFERENCE TO RELATED APPLICATIONS

The instant application is a continuation of and claims priority to co-pending U.S. patent application Ser. No. 16/918,730, titled "Using Augmented Reality Data as Part of a Fraud Detection Process," and filed on Jul. 1, 2020, the disclosure of which is hereby incorporated by reference in its entirety.

FIELD OF USE

Aspects of the disclosure relate generally to determining authenticity of data, and more specifically to using augmented reality to determine the authenticity of data.

BACKGROUND

Fraudulent transactions are becoming increasingly prevalent. While automated tools exist to examine data in order to detect whether fraudulent transactions have taken place, such automated tools suffer from a number of drawbacks. For example, in the context of analyzing financial transaction data to determine whether a transaction is fraudulent, current tools may not determine whether a transaction is fraudulent with a high enough level of accuracy to detect all fraudulent transactions. Further, such automated tools may undesirably require user intervention and/or suffer from false positives in which the tool incorrectly detects non-fraudulent transactions as being fraudulent transactions.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects described herein may address these and other issues. In particular, aspects described herein may improve the accuracy, speed, and efficiency with which transaction data, such as financial transaction data, may be determined to be fraudulent or non-fraudulent.

Aspects disclosed herein describe systems and methods that use augmented reality (AR) data for determining fraud, such as fraud detection performed by fraud detection systems. In particular, an augmented reality device may be configured to capture a feed of audiovisual data. A user of the augmented reality device may perform an authentication process to allow a fraud detection system to obtain such augmented reality data, in order to use the data from the feed as part of a fraud detection process that determines whether any transactions associated with the user are fraudulent. The fraud detection system may generally monitor the user's transaction history, and identify a transaction that the system suspects may be fraudulent. Based on identifying the suspected fraudulent transaction, the fraud detection system may access the data feed of the user's AR device and use the received data as part of the process of determining whether the suspected transaction is or is not actually fraudulent.

The augmented reality data from the feed may be used as part of the fraud detection process in various manners. For instance, a fraud detection system, augmented reality device, and/or one or more other computing devices may analyze video and/or audio received from the augmented reality feed to determine whether the user is located at a location associated with the transaction to determine a likelihood that the transaction is fraudulent. Such analysis may be performed by detecting a scene, or object from the received video of the augmented reality data, and comparing the scene or object determined from a location associated with the transaction. Such scene and object detection may be performed by a machine classifier, according to various examples. The fraud detection system may determine whether the identified scene or object is associated with the transaction location. If the fraud detection system determines that the scene or object is associated with the transaction location, the fraud detection system may allow the suspected transaction to proceed. Otherwise, the fraud detection system may cancel the transaction.

The fraud detection system may send a message to the user associated with the transaction, according to some examples. The message may, for example, request that the user perform a verification action in order to verify the transaction as non-fraudulent. For example, the message may cause an AR device to present a notification instructing the user to perform a verification action, such as pointing a camera at a specific object in the user's surroundings. The message may also cause the augmented device to capture additional audiovisual data that may capture the user performing the verification action. The fraud detection system may then determine whether or not the user performed the requested verification action. If the fraud detection system determines that the user performed the verification action, the fraud detection system may allow the suspected transaction to proceed. If the fraud detection system determines that the user did not perform the verification action, the fraud detection system may cancel the transaction.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1:
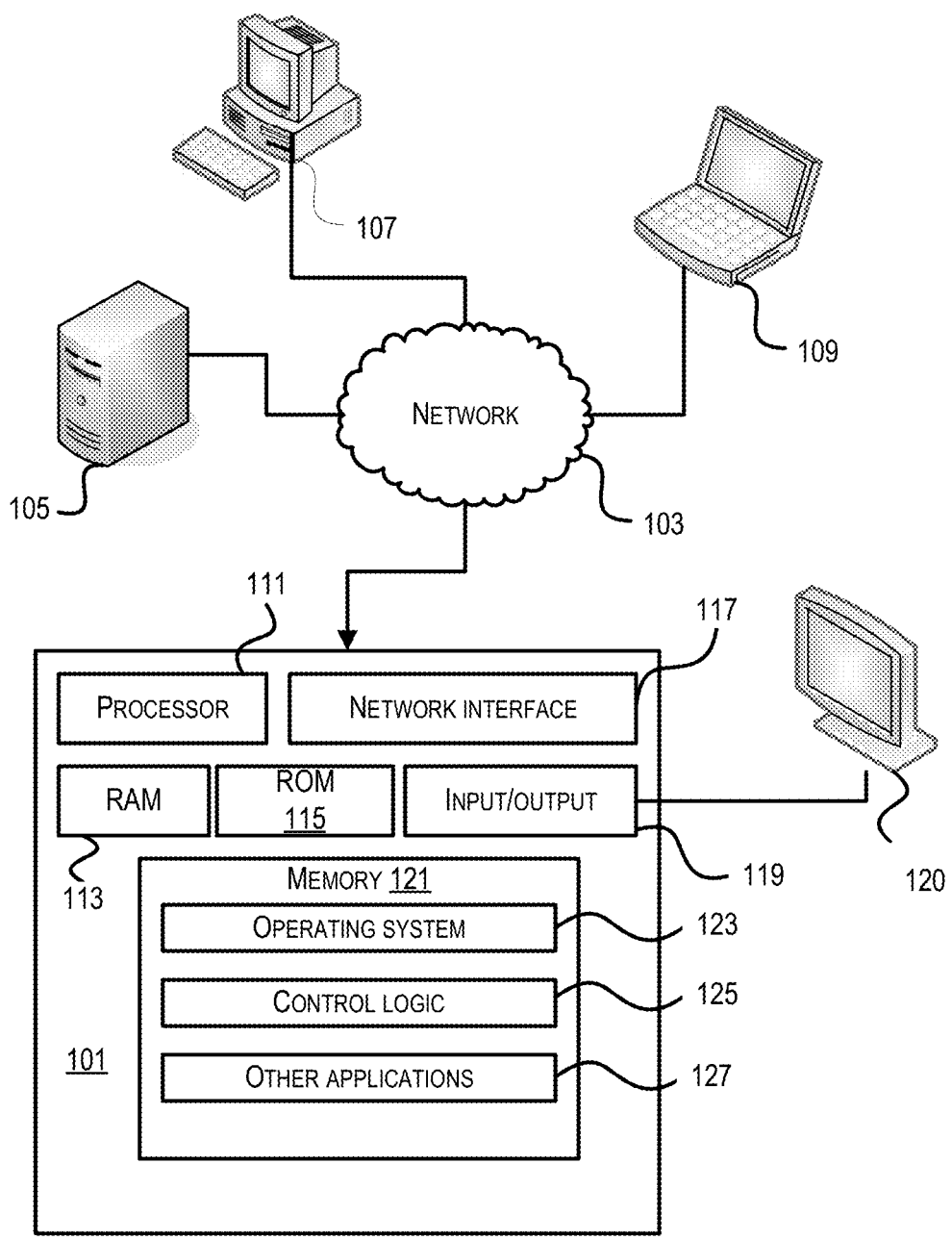
FIG. 1 shows an example of a computing device that may be used in implementing one or more aspects of the disclosure in accordance with one or more illustrative aspects discussed herein.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning.

By way of introduction, aspects discussed herein may describe methods and techniques for performing fraud detection using augmented reality devices. In particular, the methods and techniques described herein overcome the shortcomings associated with current fraud detection systems and tools that have low fraud detection accuracy and/or require user intervention to confirm whether a suspected transaction is fraudulent.

A user may wear an augmented reality (AR) device. The AR device may comprise a hearing aid, glasses, goggles, etc. In the case of an AR device that presents visual data, the AR device may include a camera that collects a feed of video data ("a video feed"), which may also include audio data. In the case that the AR device is an audio-only device, such as a hearing aid, the device may only collect audio data (an "audio feed").

The data captured by such AR devices may be received by a system that monitors for and attempts to detect and/or cancel fraudulent transactions, such as fraudulent financial transactions. Such a system may comprise one or more computing devices (e.g., servers, mobile computing devices, desktops, tablets, laptops, and/or the like) and may be referred to as a "fraud detection server system." While reference is made to servers, it should be understood that any computing device or system of computing devices may perform the functions of such a fraud detection server system. Such a system may be operated by a financial institution, payment processor, credit monitoring agency, and/or credit card company, as some examples.

Such a fraud detection server system may be configured to monitor user transactions to identify suspected fraudulent transactions. If the fraud detection server system identifies a suspected fraudulent transaction, the fraud detection server system may inform a user associated with the transaction that the suspected transaction is fraudulent. The fraud detection server system may also cancel and/or attempt to cancel the potentially fraudulent transaction. The fraud detection server system may execute various other actions in response to identifying a suspected fraudulent transaction as well.

The process of identifying a suspected fraudulent transaction may take various forms. For example, the fraud detection server system may identify suspected fraudulent transactions that have certain criteria, which may indicate that the transaction is fraudulent. Such criteria may include high transaction amounts, atypical transaction patterns (such as high transaction frequency, abnormal transaction frequency, etc.), transactions from merchants with which the user does not typically interact, transactions from locations that the user does not frequent, etc. The process of identifying a suspected fraudulent transaction may take various other forms as well. To identify such suspected fraudulent transactions, the fraud detection server system may employ various techniques, such as machine learning, machine classifiers (which may comprise neural networks, support vector machines, Bayesian classifiers, decision trees, etc.), deep learning, data mining, clustering, dimensionality reduction, and/or reinforcement learning techniques. The process of identifying such suspected fraudulent transactions may take various other forms as well.

While an existing fraud detection server system may be configured to identify suspected transactions without the use of augmented reality data, as explained above, this disclosure is directed to using augmented reality data received from an AR device as part of a fraud detection process in order to improve the accuracy of a fraud detection server system in identifying and/or confirming suspected fraudulent transactions.

As such, a fraud detection server system configured in accordance with this disclosure receives AR data from a user's augmented reality device. In some instances, the fraud detection server system may receive the augmented reality data based on identifying a suspected fraudulent transaction that is associated with a user. Based on the received augmented reality data, the fraud detection server system may determine a likelihood whether the transaction is fraudulent, and based on the likelihood, may determine whether to cancel the transaction Before discussing these concepts in greater detail, however, several examples of one or more computing devices that may be used in implementing and/or otherwise providing various aspects of the disclosure will first be discussed with respect to FIG. 1.

FIG. 1 illustrates one example of a computing device 101 that may be used to implement one or more illustrative aspects discussed herein. For example, computing device 101 may, in some embodiments, implement one or more aspects of the disclosure by reading and/or executing instructions and performing one or more actions based on the instructions. In some embodiments, computing device 101 may represent, be incorporated in, and/or include various devices such as a desktop computer, a computer server, a mobile device (e.g., a laptop computer, a tablet computer, a smart phone, any other types of mobile computing devices, and the like), smart glasses, augmented reality glasses, and/or any other type of data processing device. Computing device 101 may be an augmented reality device. An augmented reality device may be a wearable device, such as augmented reality glasses (e.g., Google Glass, Microsoft HoloLens, Magic Leap One, etc.), augmented reality goggles, etc., according to various examples. In some examples, such an augmented reality device may comprise a device with a camera and display, such as a mobile device, a tablet, a laptop, or the like. In yet further examples, such an augmented reality device may comprise a device that does not capture video, but captures audio. Such an augmented reality device that captures audio but not video may comprise headphones, hearing aids, or the like, or may take various other forms as well.

Computing device 101 may, in some embodiments, operate in a standalone environment. In other embodiments, computing device 101 may operate in a networked environment. As shown in FIG. 1, various network nodes 101, 105, 107, and 109 may be interconnected via a network 103, such as the Internet. Other networks may also, or alternatively, be used, including private intranets, corporate networks, LANs, wireless networks, personal networks (PAN), and the like. A local area network (LAN) may have one or more of any known LAN topology and may use one or more of a variety of different protocols, such as Ethernet. Devices 101, 105, 107, 109 and other devices (not shown) may be connected to one or more of the networks via twisted pair wires, coaxial cable, fiber optics, radio waves or other communication media. It will be appreciated that network 103 is for illustration purposes and may be replaced with fewer or additional computer networks.

Computing device 101 may include a processor 111, RAM 113, ROM 115, network interface 117, input/output interfaces 119 (e.g., keyboard, mouse, display, printer, etc.), and memory 121. Processor 111 may include one or more computer processing units (CPUs), graphical processing units (GPUs), and/or other processing units. Processor 111 may also include a single central processing unit (CPU), which may be a single-core or multi-core processor, or may include multiple CPUs. Processor(s) 111 and associated components may allow the computing device 101 to execute a series of computer-readable instructions to perform some or all of the processes described herein. Although not shown in FIG. 1, various elements within memory 121 or other components in computing device 101, may include one or more caches, for example, CPU caches used by the processor 111, page caches used by the operating system 123, disk caches of a hard drive, and/or database caches used to cache content from a database. For embodiments including a CPU cache, the CPU cache may be used by one or more processors 111 to reduce memory latency and access time. A processor 111 may retrieve data from or write data to the CPU cache rather than reading/writing to memory 121, which may improve the speed of these operations. In some examples, a database cache may be created in which certain data from the database is cached in a separate smaller database in a memory separate from the database, such as in RAM 113 or on a separate computing device. For instance, in a multi-tiered application, a database cache on an application server may reduce data retrieval and data manipulation time by not needing to communicate over a network with a back-end database server. These types of caches and others may be included in various embodiments, and may provide potential advantages in certain implementations of devices, systems, and methods described herein, such as faster response times and less dependence on network conditions when transmitting and receiving data.

Input/output (I/O) device 119 may include a microphone, keypad, touch screen, and/or stylus through which a user of the computing device 101 may provide input, and may also include one or more of a speaker for providing audio output and a video display device for providing textual, audiovisual, and/or graphical output. In some embodiments, I/O device 119 may include an image capture device, such as a camera. Software may be stored within memory 121 to provide instructions to processor 111 that allow computing device 101 to perform various actions. For example, memory 121 may store software used by the computing device 101, such as an operating system 123, control logic 125, and/or one or more applications 127. The various hardware memory units in memory 121 may include volatile and nonvolatile, removable and non-removable media implemented in any method or technology for storage of information such as computer-readable instructions, data structures, program modules, or other data. Memory 121 may include one or more physical persistent memory devices and/or one or more non-persistent memory devices. Memory 121 may include, but is not limited to, random access memory (RAM) 113, read only memory (ROM) 115, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor 111.

Network interface 117 may include one or more transceivers, digital signal processors, and/or additional circuitry and software for communicating via any network, wired or wireless, using any protocol as described herein. Network interface 117 may also include near field communication (NFC) capabilities, short-range wireless communication capabilities (e.g., Bluetooth®), wireless communication capabilities (e.g., Wi-Fi), or any combination thereof. In some embodiments, communication interface 117 may include a GPS receiver/antenna. The GPS receiver/antenna may be configured to receive one or more signals from one or more global positioning satellites to determine a geographic location of computing device 101. The geographic location provided by the GPS receiver/antenna may be used for navigation, tracking, and positioning applications. For the purposes of the augmented reality device, the GPS receiver/antenna may be used to locate the augmented reality device. In some embodiments, the GPS receiver/antenna may determine the location of the augmented reality device relative to a user computing device, and may be used to provide the location of the augmented reality device to a fraud detection system.

Devices 105, 107, 109 may have similar or different architecture as described above with respect to computing device 101. It will appreciate that the functionality of computing device 101 (or device 105, 107, 109) herein may be spread across multiple data processing devices, for example, to distribute processing load across multiple computers, to segregate transactions based on geographic location, user access level, quality of service (QoS), etc. For example, devices 101, 105, 107, 109, and others may operate in concert to provide parallel computing features in support of the operation of control logic 125.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, may be written in a scripting language such as JavaScript or Python and/or a markup language such as HTML or XML, etc. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

Figure 2:
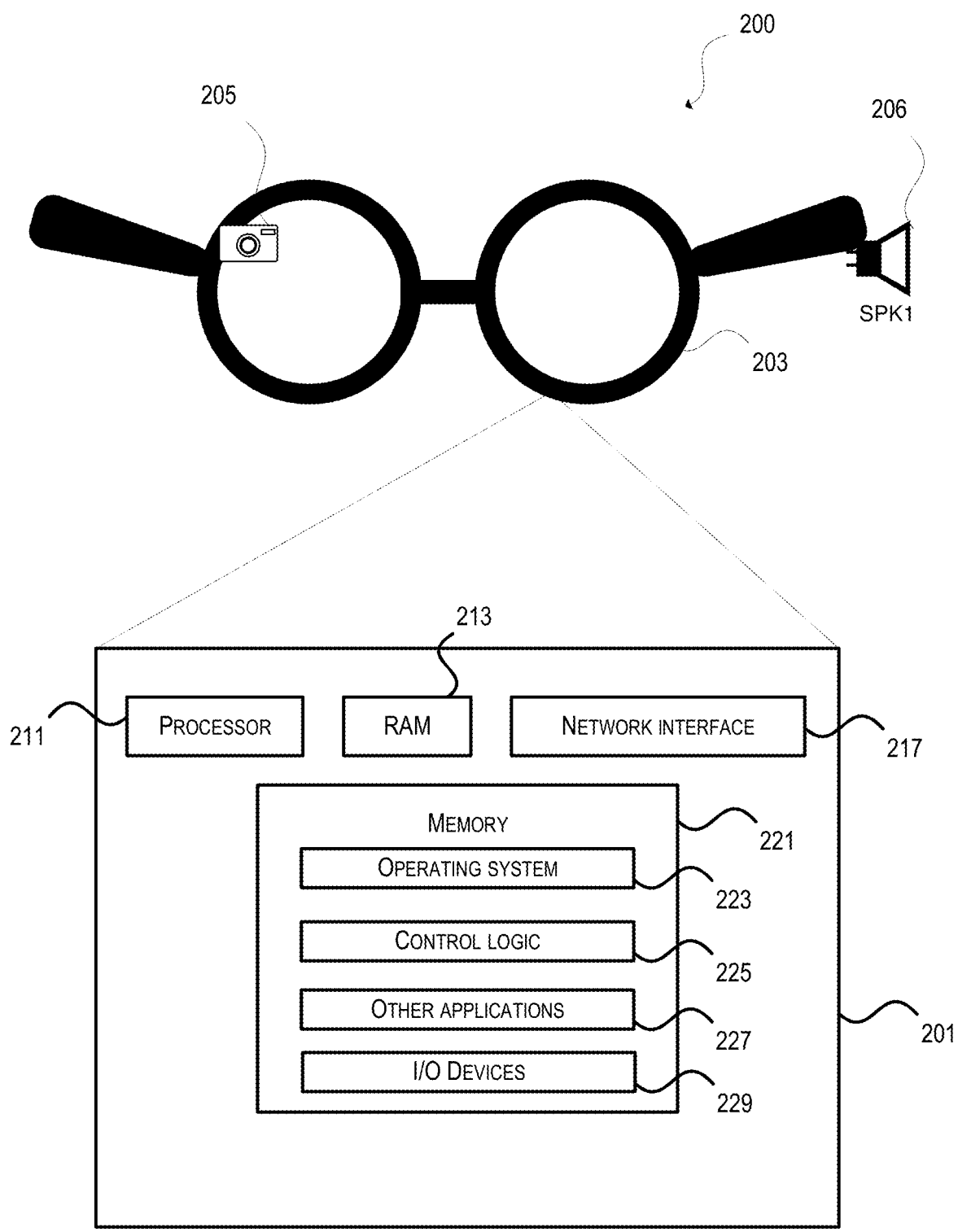
FIG. 2 shows an example of augmented reality device that facilitates using augmented reality data as part of performing a fraud detection process according to one or more aspects of the disclosure.

As discussed above, some accounts, applications, services, and/or resources may provide for fraud detection based on data received from an augmented reality device. FIG. 2 illustrates an example of such an augmented reality device that facilitates fraud detection according to one or more aspects of the disclosure. Augmented reality device 200 may be a wearable device, such as glasses 203. Instead of glasses, augmented reality device 200 may comprise: goggles, a visor, earbuds, headphones, a hearing aid, or any other form of AR device. In some examples, augmented reality device 200 may include a computing device, such as computing device 101. In some embodiments, augmented reality device 200 may include a mobile device, tablet, laptop computer, or an equivalent thereof.

In addition to glasses 203, augmented reality device 200 may comprise an image capture device 205, and/or speaker 206, and computing logic 201. Augmented reality device 200 may comprise a projector (not shown) to project an image on to the lenses of glasses 203 to provide an augmented view of reality, in some examples. In some examples, the lenses may be a transparent display (e.g., a liquid crystal display (LCD)) that is configured to display images without obstructing the wearer's vision.

Image capture device 205 may be a camera, array of cameras, video camera, or an equivalent thereof. A camera may also include sensors for measuring depth/disparity and the like. For instance, a camera may comprise multiple sensors, such as a first image sensor for capturing video data, and a second IR sensor (or laser sensor) for capturing depth information. In some embodiments, augmented reality device 200 may include a plurality of image capture devices. For example, image capture devices may be located at the temples and/or the bridge of glasses frames. Alternatively, the augmented reality device 200 may be a mobile device that includes a plurality of image capture devices. In some embodiments, image capture device 205 may be constantly recording.

Augmented reality device 200 may comprise one or more speakers 206 according to various examples. Such speakers may be positioned at or near the users' ears such that the user can hear the audio when produced by speaker 206.

Computing logic 201 may be similar to computing device 101 described above with respect to FIG. 1. In this regard, computing logic 201 may include a processor 211, RAM 213, network interface 217, and memory 221. In some examples, computing logic 201 may comprise a system-on-a-chip (SoC), microcontroller, programmable logic device (PLD), application-specific integrated circuit (ASIC), field programmable gate array (FPGA), and or graphics processing unit (GPU). The memory 221 may include an operating system 223, control logic 225, and/or other applications 227. Processor 211 may be any of the processors described above with respect to processor 111. Similarly, memory 221 may be any of the types of memory described above with respect to memory 121. Additionally, memory 221 may store software for configuring computing device 201 into a special purpose computing device in order to perform one or more of the various functions discussed herein. As discussed above, memory 221 may store operating system software 223 for controlling overall operation of augmented reality device 200, control logic 225 for instructing augmented reality device 200 to perform aspects discussed herein, and other applications 227. Applications 227 may include one or more applications that allow augmented reality device 200 to perform the processes and algorithms described herein. For example, applications 227 may include an application that is configured to provide data to, and/or obtain data from a fraud detection server system as part of a fraud detection process.

Much like processor 211 and memory 221, network interface 217 may be similar to network interface 117. In this regard, network interface 217 may include one or more transceivers, digital signal processors, and/or additional circuitry and software for communicating via any network, wired or wireless, using any protocol as described herein. Network interface 217 may also include near field communication (NFC) capabilities, short-range wireless communication capabilities (e.g., Bluetooth®), wireless communication capabilities (e.g., Wi-Fi), or any combination thereof.

Augmented reality device 200 may include a plurality of input/output devices 229. In addition to image capture device 205, augmented reality device 200 may include an additional image capture device that is configured to obtain one or more biometric samples from a user for authentication purposes. Additionally, augmented reality device 200 may include a speaker and microphone. In some embodiments, augmented reality device 200 may be controlled via voice commands received via the microphone. Additionally, augmented reality device 200 may provide aural feedback, for instance via speaker 206. In some examples, augmented reality device 200 may provide aural feedback as part of the augmented reality display.

As part of the fraud detection process, an augmented reality device may provide data, such as audiovisual data captured as part of an audio and/or video feed, to a fraud detection as part of a fraud detection process. The provided augmented reality data may be provided to the fraud detection server system directly, or via one or more intermediary computing devices. In order to protect a user's privacy, a user of the augmented reality device may opt-in to allow an application to provide augmented reality feed data to the fraud detection server system.

For example, a user may authorize an application provide augmented reality feed data from augmented reality device 200 to a fraud detection server system as input to a fraud detection process performed by the fraud detection server system. In response to receiving the augmented reality feed data, the fraud detection server system may make various determinations. Such determinations may comprise, for example, a scene that is associated with the feed data, an object determined based on the feed data, location data, whether a user performed a verification action, or whether audio matches a particular characteristic. Such determinations may take various other forms as well.

Figure 3A:
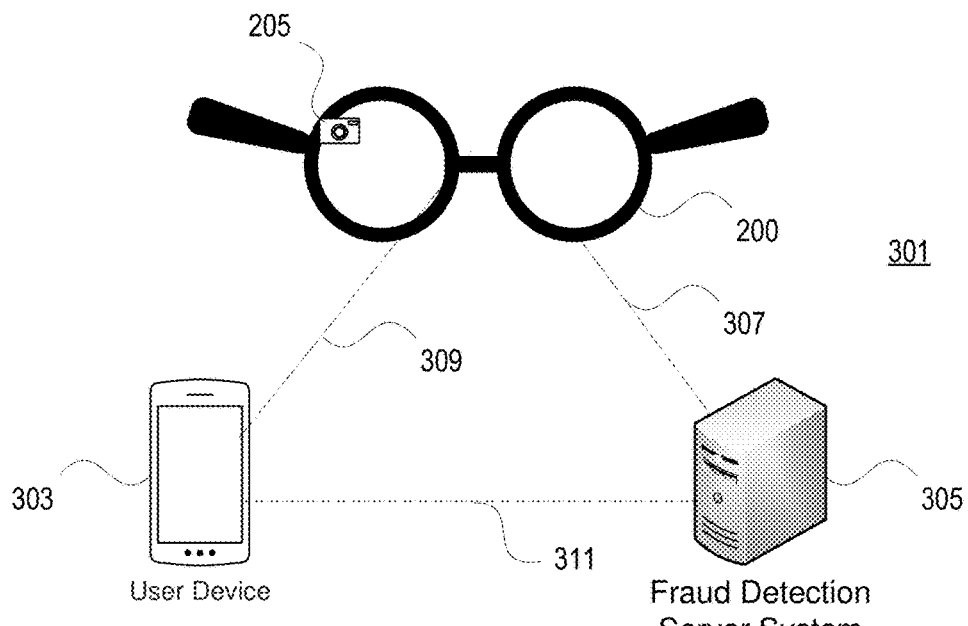
FIGS. 3A and 3B show examples of systems that facilitate using augmented reality data as part of performing a fraud detection process according to one or more aspects of the disclosure.
Figure 3B:
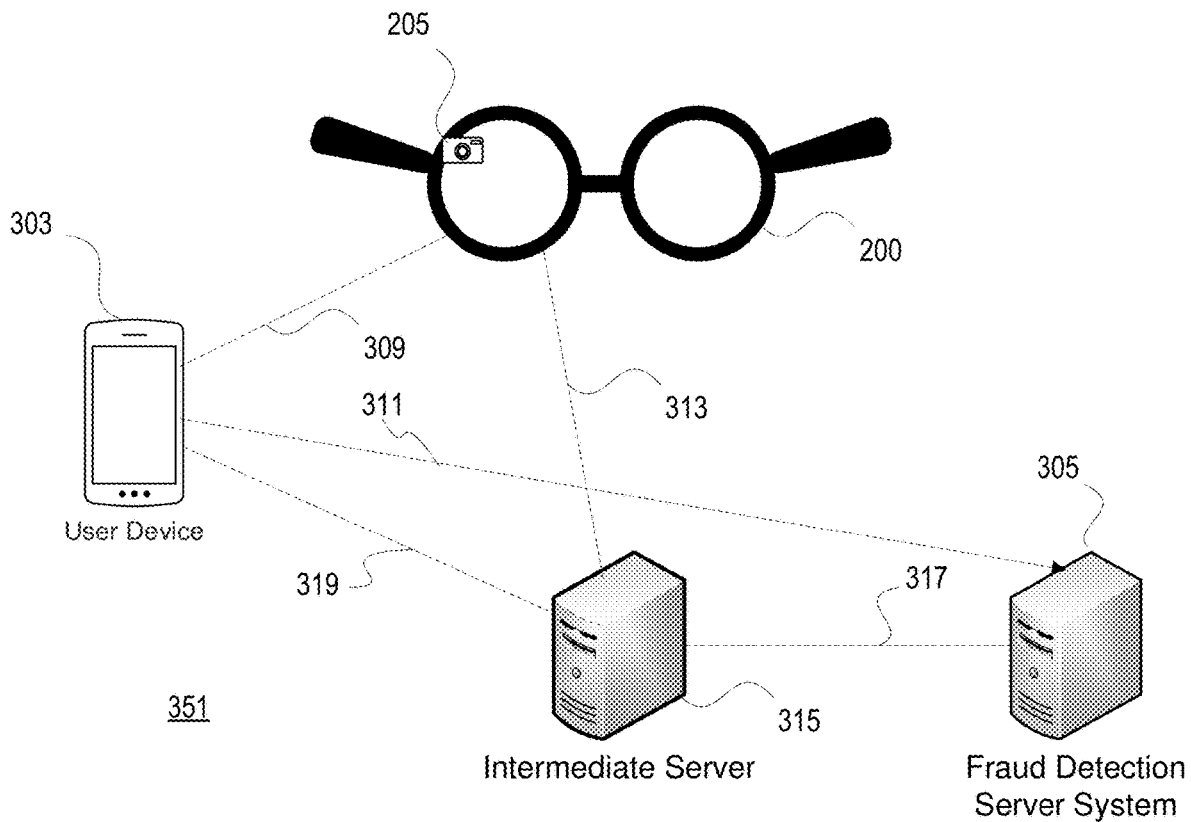

Based on the determination, the fraud detection server system may take various actions, such as canceling the suspected fraudulent transaction, allowing the suspected transaction to proceed, and/or notifying the user. Such actions taken based on the determination take various other forms as well. FIG. 3A and FIG. 3B depict examples of systems that may perform part of a fraud determination process based on data received from an augmented reality device.

FIG. 3A illustrates an example of system 301, in which an augmented reality device plays a role (e.g., provides data) to a fraud determination process, which may be performed by a fraud detection server system, such as fraud detection server system 305. System 301 may include augmented reality device 200, user device 303, and fraud detection server system 305. Augmented reality device 200, user device 303, and/or fraud detection server system 305 may be communicatively coupled via one or more communication links (e.g., 307, 309, 311). The communication links 307, 309, 311 may be any suitable communication link, such as a wired and/or wireless links. In some embodiments, communication links 307, 309, and 311 may be internet connections.

Augmented reality device 200 was discussed above with respect to FIG. 2. Augmented reality device 200 may include an image capture device 205. The image capture device 205 may be configured to capture video and/or images of what the user views. The user may view a display of user device 303.

User device 303 may include any type of computing device, including a mobile device, a smart phone, a desktop computer, a laptop computer, a tablet computer, or any other kind of computing or data processing device. User device 303 may include one or more components of computing device 101, discussed above with respect to FIG. 1. Additionally, user device 303 may execute one or more applications, such as financial applications, etc. One or more of the applications (e.g., a financial application) may obtain augmented reality data from augmented reality device 200 and provide the obtained data to fraud detection server system 305 for the purpose of providing such augmented reality data to a fraud detection process.

Fraud detection server system 305 may comprise one or computing devices (e.g., servers) that may perform a fraud detection process. The fraud detection process may identify suspected fraudulent transactions and take various actions based on identifying a suspected fraudulent transaction.

In this regard, fraud detection server system 305 may include a database server, a directory service server, a computing server, an application server, a transaction server, a machine learning server, datamining server, a web server, or any other kind of remote server that processes data.

Fraud detection server system 305 may comprise one or more transaction servers, which may access a feed of transactions (e.g., financial transactions). Each transaction may originate from one or more financial institutions, payment processors, and/or the like, and may be stored, for instance in a database or another data store for retrieval, search, and/or modification, etc. Each transaction may comprise or may be associated with information such as: a transaction amount, transaction location, transaction identifier, transaction date, merchant identifier, payment method (such as a credit card), etc. Each transaction may also be associated with a user. Fraud detection server system 305 may maintain a database of such users that may be associated with each transaction.

In operation, augmented reality device 200 may provide augmented reality data to fraud detection server system 305. The process of providing augmented reality data to fraud detection server system 305 may take various forms. For instance, the augmented reality device 200 may provide the augmented reality data to user device 303, for example via a wireless connection such as Bluetooth, Wi-Fi, Bluetooth LE, etc., and, based on receiving the augmented reality data, may send the received augmented reality data to fraud detection server system 305. In some examples, augmented reality device 200 may send the augmented reality data directly to fraud detection server system 305, via a cellular (e.g., 3G, 4G, 5G) and/or Wi-Fi (e.g., IEEE 802.11x) connection, etc. In some examples, user device 303 may receive augmented reality data from augmented reality device 200, and may provide that augmented data to fraud detection server system 305. User device 303 may also send and receive various other data to and from fraud detection server system 305 that may be used as input to the fraud detection process.

In some examples, as part of executing an application that communicates with fraud detection server system 305, user device 303 may act as an intermediary between augmented reality device 200 and fraud detection server system 305. For instance, user device 303 may provide data from an audiovisual feed of augmented reality data received from augmented reality device 200 to fraud detection server system 305. For instance, before providing such augmented reality data to fraud detection server system 305, an application, which may execute on user device 303 and/or augmented reality device 200, may prompt a user for permission to send the augmented reality data, and based on obtaining such permission, the application may provide the augmented reality data to fraud detection server system 305. In some instances, the permission to obtain the augmented reality data may be temporary (e.g., for a limited period of time). Alternatively, the permission to obtain the augmented reality data may be permanent.

Fraud detection server system 305 may monitor transactions by executing a fraud detection process. The fraud detection process may comprise an application that may analyze transactions to identify suspected fraudulent transactions. In some instances, the transactions may be analyzed in real-time. In some cases, some or all of the transactions may be analyzed in non-real-time. The fraud detection process may execute in a distributed fashion (e.g., on multiple computing devices) or on a single computing device.

The process of identifying a suspected fraudulent transaction may take various forms. For example, the fraud detection server system may identify suspected fraudulent transactions based on certain criteria associated with one or more transactions. Such criteria associated with the transactions may indicate a likelihood that the transaction is fraudulent. Such criteria may comprise, as some examples, high transaction amounts, atypical transaction patterns (such as high transaction frequency), transactions from merchants that the user does not typically frequent, transactions from locations that the user does not frequent, etc.

Based on identifying a suspected fraudulent transaction, the fraud detection server system 305 may obtain augmented reality data originating from augmented reality device 200, and use the obtained augmented reality data as input to a fraud detection process. In some examples, augmented reality device 200 and/or user device 303 may generate meta-information by processing the feed data captured by augmented reality device 200. Augmented reality device 200 and/or user device 303 may send the meta-information to fraud detection server system 305 instead of, or in in addition to, the augmented reality data. Fraud detection server system 305 may use the meta-information as part of the fraud detection process.

Fraud detection server system 305 may continuously obtain the augmented reality data in some cases, and may analyze the continuously-obtained data based on identifying a suspected transaction. In some examples, fraud detection sever system 305 may discard such continuously-obtained augmented reality data if it is determined not to be associated with a fraudulent transaction.

In various examples, fraud detection server system 305 may obtain the augmented reality data based on (e.g., in response to) identifying a fraudulent transaction. For instance, fraud detection server system 305 may identify a suspected fraudulent transaction based on the transaction having a transaction amount. Based on identifying the suspected fraudulent transaction, fraud detection server system 305 may identify a user associated with the transaction, and request augmented reality data from augmented reality device 200, which is associated with the user.

In some examples, fraud detection server system 305 may identify one or more time periods associated with the transaction, such as a time range that the transaction took place, and may specify a time period of augmented reality data that is to be obtained from augmented reality device 200, for instance based on one or more time stamps included with, and/or associated with the message. In response to sending the request, fraud detection server system 305 may receive the requested augmented reality data, and may analyze the received augmented reality data as part of a fraud detection process, which may take various forms.

The fraud detection process may involve the fraud detection sever system 305 making various determinations based on the augmented reality data received from augmented reality device 200. Based on such determinations, fraud detection sever system 305 may determine a likelihood that the transaction is fraudulent, and based on that determination, may take one or more actions based on the determined likelihood.

Such determinations that fraud detection server system 305 may make may take various forms. According to some examples, fraud detection sever system 305 may determine one or more objects from the augmented reality data originating from user device 200. For instance, fraud detection server system 305 may use a machine classifier to detect whether a certain type of object is present within a video feed of augmented reality device 200, and whether that type of object is consistent with the identified suspicious transaction.

In some examples, based on identifying a suspicious transaction, fraud detection server system 305 may determine that the transaction is associated with a given location, such as an electronics store. Based on the transaction location being determined as an electronics store, fraud detection server system 305 may attempt to recognize objects that may be present in, or associated with the electronics store. Examples of such objects that may be present in such an electronics store may comprise objects such as TVs, smartphones, etc. If fraud detection server system 305 recognizes one or more of these objects from the augmented reality data (e.g., with a sufficiently high likelihood or probability), fraud detection server system 305 may determine that there is a high likelihood that the suspected fraudulent transaction (e.g., from an electronics store) is non-fraudulent. If the type of objects associated with the transaction are not recognized by the fraud detection server system 305, fraud detection server system 305 may determine that there is a low likelihood that the transaction is non-fraudulent.

As another example, the fraud detection sever system 305 may determine a count of one or more types of objects are detected on the video of augmented reality device 200. For instance, if the transaction location is a bookstore, that location may be associated with a significant number of books that would be captured in the augmented reality data feed. If fraud detection sever system 305 detects a sufficient number of books based on the augmented reality data, fraud detection sever system 305 may determine that there is a high likelihood that the suspected transaction (e.g., from a bookstore) is non-fraudulent.

In some examples, such as if the recognized object is determined to be text, fraud detection server system 305 may perform optical character recognition (OCR) and/or natural language processing (NLP) on the recognized text to determine whether the text is consistent with the transaction. As an example, fraud detection server system 305 may recognize text that takes the form of a price tag, and may perform NLP and/or OCR to determine whether the text from the price tag is consistent with a price associated with the transaction, such as the price of an item in the suspected transaction or the entire suspected transaction. As another example, if the transaction location is associated with a restaurant, and fraud detection server system recognizes text from the augmented reality data, fraud detection server system 305 may determine whether the recognized text is consistent with the type of restaurant (e.g., if the transaction location is an Italian restaurant, whether the menu items are associated with an Italian restaurant). If the recognized text is consistent with the transaction location, fraud detection server system 305 may determine that the transaction is likely non-fraudulent.

In some more examples, fraud detection server system 305 may detect a scene based on the received augmented reality data, and may determine a likelihood that the transaction is fraudulent based on based on the detected scene. For instance, if the detected scene is consistent with a restaurant, and the transaction location is a restaurant, fraud detection server system 305 may determine there is a high likelihood that the transaction is non-fraudulent. As another example, if the transaction is associated with a physical store that is indoors, and fraud detection server system 350 detects an outdoor scene (e.g., indicating that the user is currently outside) based on the augmented reality data, fraud detection server system 305 may determine that there is a high likelihood that the transaction is fraudulent (e.g., because the user is located outdoors as opposed to being located indoors and thus cannot be inside the merchant's location).

Scene detection, object identification, and object recognition techniques may be performed using a machine classifier. In some instances, the particular machine classifier architecture may alternatively or additionally be implemented on computing devices other than fraud detection server system 305, such as user device 303, and/or augmented reality device 200, as some non-limiting examples.

The particular machine classifier used as part of these functions may be selected based on various factors, such as the computing capabilities of each device, speed of the machine classifier, and/or the transaction location. The machine classifier may be selected based on other factors as well. For example, if fraud detection server system 305 determines that the user is located in a restaurant (e.g., based on information associated with the transaction and/or other location data such as GPS data), a machine classifier that has been trained to identify or recognize objects associated with restaurants may be selected. In the event that no specific machine classifier is available, a generic machine classifier may be selected.

In any case, based on the determined likelihood that the suspected fraudulent transaction is fraudulent, fraud detection server system 305 may take one or more actions. These actions may take various forms. As some examples, based on determining a high likelihood that a suspected transaction is fraudulent, fraud detection server system 305 may cancel the suspected transaction, lock a credit card associated with the user to prevent future purchases (e.g., until a confirmation that the transaction is non-fraudulent is received from the user), and/or may send a notification to a computing device of the user of the suspected fraudulent transaction (e.g., indicating that the suspected transaction was canceled). As another example, if fraud detection server system 305 determines a high likelihood that the transaction is non-fraudulent, fraud detection server system 305 may allow the suspected fraudulent transaction to proceed.

As still another example, fraud detection server system 305 may send a message to a device of the user associated with the suspected fraudulent transaction. The message may request that the user perform a verification action in order to allow the transaction to proceed. The requested verification action may take various forms. As one example, the requested verification action may take the form of requesting that the user perform a gesture, such as a "thumbs up" gesture. As another example, the verification action may take the form of requesting that the user point a camera of augmented reality device 200 at a specified object (e.g., a price tag, or another specific object that may be associated with the transaction) to verify that the user is in proximity to an object that is associated with the transaction.

In response to requesting that the user perform the verification action, fraud detection server system 305 may obtain additional augmented reality data that may indicate whether the user performed the verification action. Fraud detection sever system 305 may determine, based on the additionally-received augmented reality data, whether the user performed the requested verification action. Fraud detection server system 305 may determine whether the user performed the requested verification action using various techniques, such as machine vision and/or deep learning techniques, which may involve a machine classifier.

If fraud detection server system 305 determines that the user performed the verification action, fraud detection server system 305 may take an action, such as allowing the transaction to proceed. Otherwise, fraud detection server system 305 may take an action, such as canceling the transaction, or re-requesting that the user perform the verification action, etc. Fraud detection server system 305 may take various other actions based on additional augmented reality data as well.

FIG. 3B illustrates another example of system 351, where an augmented reality device plays a role in a multifactor authentication process. System 351 may include augmented reality device 200, user device 303, intermediate server 315, and fraud detection server system 305. Augmented reality device 200, user device 303, intermediate server 315, and/or fraud detection server system 305 may be communicatively coupled via one or more communication links (e.g., 309, 311, 313, 317, 319). The communication links 309, 311, 313, 317, and 319 may be any suitable communication link, such as a wired and/or wireless links.

Augmented reality device 200, user device 303, and fraud detection server system 305 may be configured to perform similar to the augmented reality device, user device, and service server discussed above with respect to FIG. 3A. In system 351, intermediate server 315 may be configured to receive augmented reality data, and/or include meta-information related to augmented reality data from augmented reality device 200 and to provide augmented reality data to fraud detection server system 305 based on requests from fraud detection server system 305.

In some examples, intermediate server 315 may be a third-party server. Such a third-party server may operate to preserve a user's privacy and/or to act as a single source of augmented reality data that is provided to multiple different requesting parties. For example, a user may not feel comfortable with providing his or her augmented reality data directly to fraud detection server system 305 without certain guarantees regarding privacy of that augmented reality data, such as: removal of sensitive metadata and/or personally identifiable information. Accordingly, intermediate server 315 may provide such guarantees regarding a user's augmented reality data by removing such sensitive metadata and such personally identifiable information. Intermediate server 315 may also act as a central hub, which stores a user's augmented reality data. In storing the user's augmented reality data, intermediate server 315 may avoid computing devices belonging to a user, such as augmented reality device 200 and/or user device 303, having to provide the same augmented reality data to multiple different entities (e.g., systems, organizations, etc.).

Figure 4:
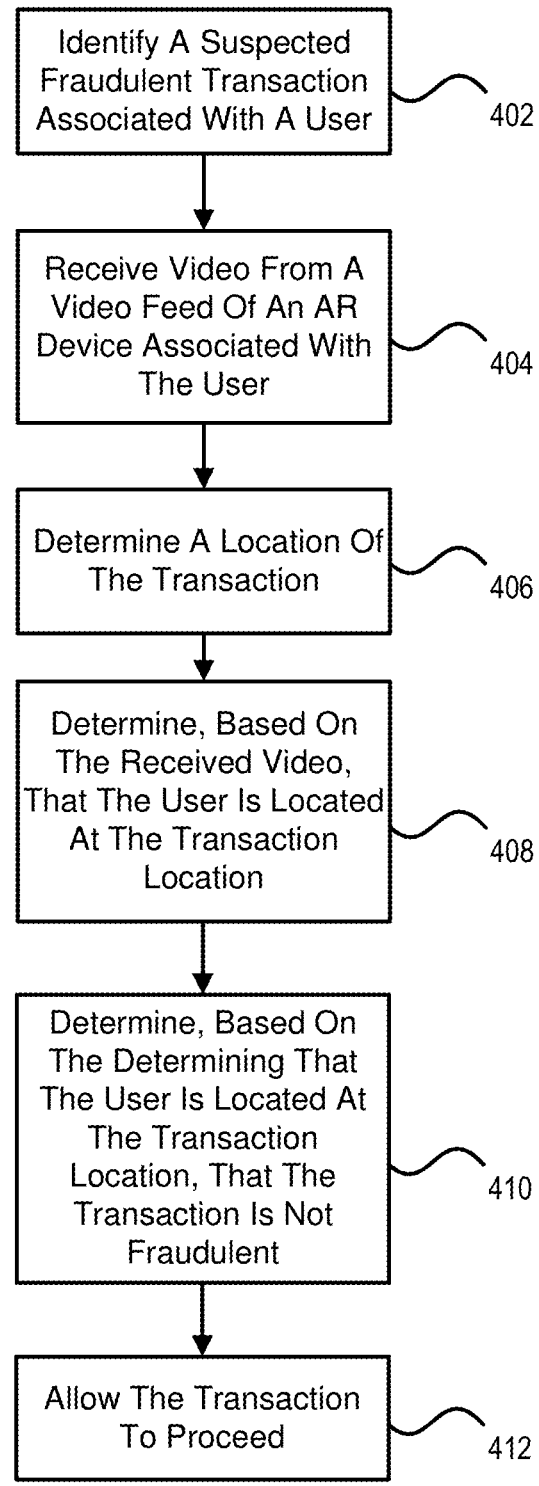
FIG. 4 depicts a flowchart of a fraud detection process that uses augmented reality data according to one or more aspects of this disclosure.

Augmented reality devices provide augmented data, which may be used as part of performing a fraud detection process. FIG. 4 illustrates a flowchart of a process 400 for using an augmented reality device as part of performing a fraud detection process according to one or more aspects of the disclosure. Some or all of the steps of process 400 may be performed using one or more computing devices, such as augmented reality device 200 of FIG. 2, as described herein.

At step 402, a fraud detection server system (e.g., fraud detection server system 305) may identify a suspected fraudulent transaction associated with a user. As described above, the fraud detection server system may identify a suspected fraudulent transaction based on criteria, such as high transaction amounts, atypical transaction patterns (e.g., high transaction frequency), transactions from merchants that the user does not typically frequent, transactions from locations that the user does not frequent, etc.

At step 404, the fraud detection server system may receive video from a video feed of an augmented reality (AR) device associated with the user (e.g., augmented reality device 200). In some examples, the fraud detection server system may receive the augmented reality data directly from the augmented reality device, or may receive the augmented reality data indirectly from one or more intermediary devices, such as a user device (e.g., user device 303) and/or intermediate server 315.

At step 406, the fraud detection server system may determine a location of the transaction. The transaction location may be determined based on location data associated with the transaction (e.g., a merchant name, location, and/or other geographic data associated with the transaction), and/or or various other types of data.

At step 408, the fraud detection server system may determine, based on the received video, that the user is located at the transaction location. The determination of whether the user is located at the transaction location may be determined based on various location data associated with the user, such as GPS data from one or more of the computing devices associated with the user. The fraud detection server system may also determine that the user is located at the transaction location based on the augmented reality data, for instance by recognizing or determining an object, or scene associated based on the augmented reality data. If, for example, the scene or object recognized or detected based on the augmented reality data is associated with the transaction location, the fraud detection server system may determine that the user is located at the transaction location.

At step 410, the fraud detection server system may determine, based on the determining that the user is located at the transaction location, that the transaction is not fraudulent. At step 412, the fraud detection server system may allow the transaction to proceed. The fraud detection server system may allow the transaction to proceed based on determining that the transaction is not fraudulent.

Figure 5:
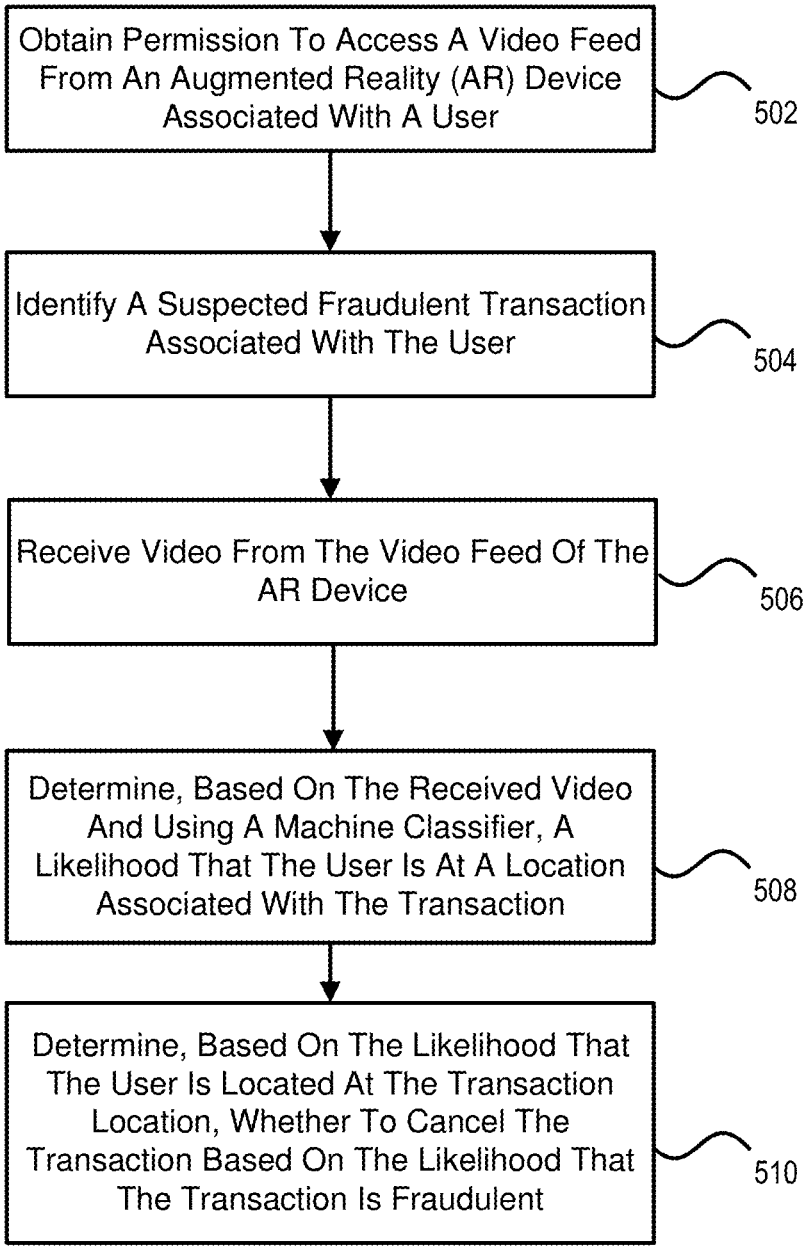
FIG. 5 depicts a flowchart of a fraud detection process that uses augmented reality data according to one or more aspects of this disclosure.

To protect a user's privacy, a user may first provide permission for another computing device, such as a fraud detection server system, or intermediate device 315, to access the augmented reality data of that augmented reality device before providing the augmented reality data to the fraud detection server system. FIG. 5 illustrates a flowchart of a process 500 for providing augmented reality data to a fraud detection server system based on obtaining permission to access the augmented reality data. Some or all of the steps of process 500 may be performed using one or more computing devices described herein.

At step 502, the fraud detection server system may obtain permission to access a video feeds from an augmented reality device (e.g., augmented reality device 200). The process of obtaining permission to access the video feed form the augmented reality device may involve sending a message requesting permission to access the video feed, requesting permission to access the video feed data from an intermediary computing device, such as intermediate server 315, etc.

At step 504, the fraud detection server system may identify a suspected fraudulent transaction associated with the user. As described herein, the fraud detection server system may identify a suspected fraudulent transaction based on criteria, such as high transaction amounts, atypical transaction patterns (e.g., high transaction frequency), transactions from merchants that the user does not typically frequent, transactions from locations that the user does not frequent, etc.

At step 506, the fraud detection server system may receive video from the augmented reality device. According to some examples, the fraud detection server system may alternatively or additionally receive meta-information that is related to video from the augmented reality device.

At step 508, the fraud detection server system may determine, based on the received video, and/or meta-information, and using a machine classifier, a likelihood that the user is at a location associated with the transaction. As described herein, the machine classifier may determine the likelihood that the user is at the location associated with the transaction location based on the augmented reality data, for instance by recognizing or determining an object, or scene based on the augmented reality data. If, for example, the scene or object recognized or detected based on the augmented reality data is associated with the transaction location, the fraud detection server system may determine that there is a high likelihood that the user is located at the transaction location.

At step 510, the fraud detection server system may determine, based on the likelihood that the user is located at the transaction location, whether to cancel the transaction based on the likelihood that the transaction is fraudulent. If there is a high likelihood that the user is located at the transaction location, the fraud detection server system may determine that there is a high likelihood that the suspected transaction is non-fraudulent, and may determine that the transaction should proceed. If there is a high likelihood that the transaction is fraudulent, the fraud detection server system may determine that the transaction should be canceled, and may cancel the transaction.

Figure 6:
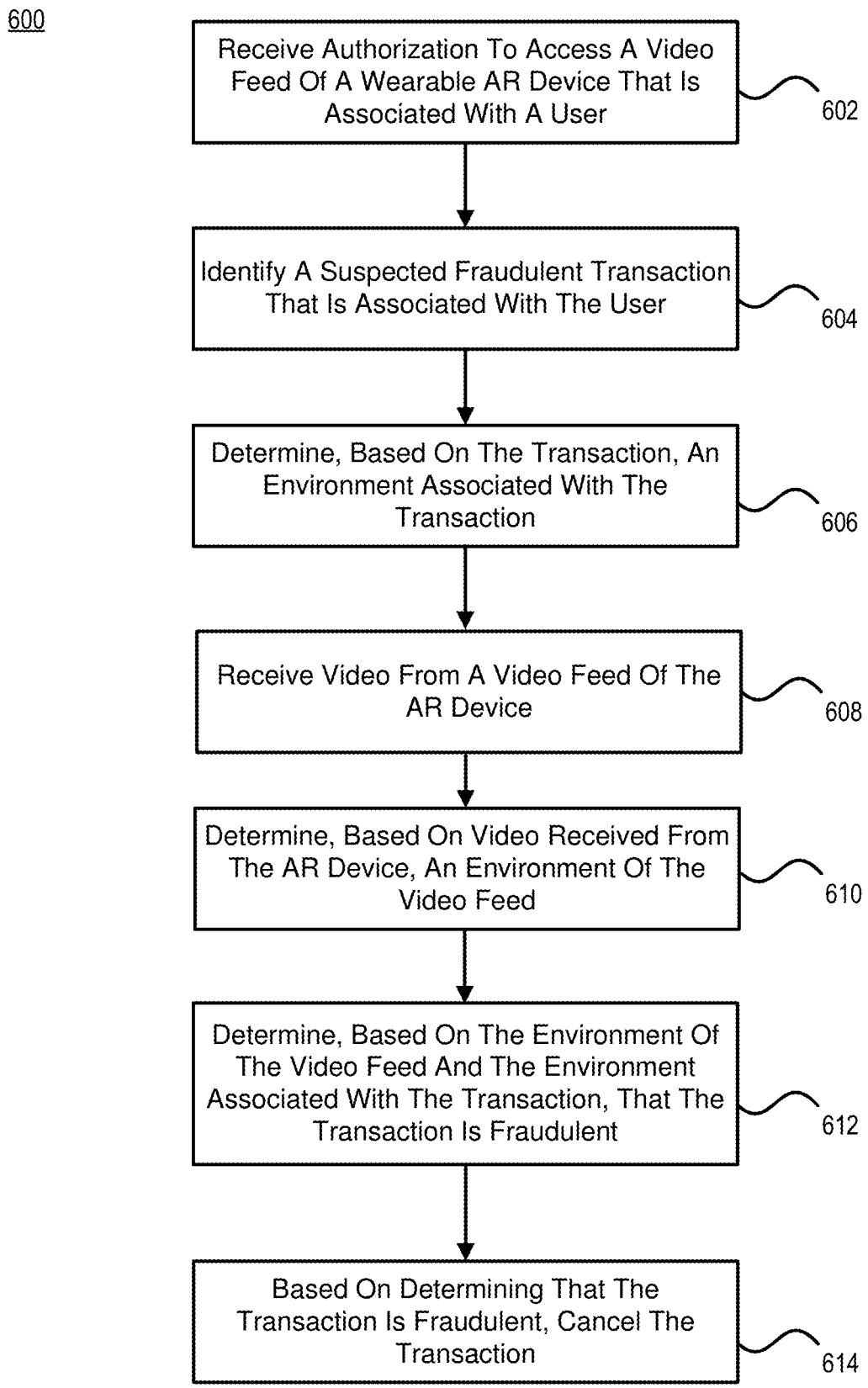
FIG. 6 depicts a flowchart of a fraud detection process that uses augmented reality data according to one or more aspects of this disclosure.

According to some examples, a fraud detection server system may determine whether a suspected transaction is fraudulent based on an environment associated with the transaction. FIG. 6 illustrates a flowchart of a process 600 for determining, based on the environment, to cancel a transaction according to one or more aspects of the disclosure. Some or all of the steps of process 600 may be performed using one or more computing devices described herein.

In step 602, the fraud detection server system may receive authorization to access a video feed of a wearable augmented reality (AR) device that is associated with a user. Fraud detection server system 305 may obtain permission to access the video feed, e.g., in response to requesting the permission from a computing device of the user, such as augmented reality device 200 or user device 303.

In step 604, the fraud detection server system may identify a suspected fraudulent transaction that is associated with the user. As described above, the fraud detection server system may identify a suspected fraudulent transaction based on criteria, such as high transaction amounts, atypical transaction patterns (e.g., high transaction frequency), transactions from merchants that the user does not typically frequent, transactions from locations that the user does not frequent, etc.

At step 606, the fraud detection server system may determine, based on the transaction, an environment associated with the transaction. Such an environment may be determined in various manners, such as using a scene detection algorithm, location data, transaction data (e.g., a merchant category code or other data associated with the suspected fraudulent transaction). Such a transaction environment may be determined in various other manners as well.

At step 608, the fraud detection server system may receive, from the AR device, video from the video feed. In some examples, the fraud detection server system may alternatively or additionally receive meta-information related to the video feed.

At step 610, and based on the received video, the fraud detection server system may determine an environment of the video feed. Such an environment may be determined in various manners, such as using a scene detection algorithm, location data, and/or based on objects recognized or detected from the video feed.

At step 612, the fraud detection server system may determine, based on the environment of the video feed and the environment associated with the transaction, that the transaction is fraudulent. For instance, fraud detection server system may determine that the environment of the video feed is not consistent with the environment of the transaction. Such a determination might occur if the environment of the transaction is indoors and at a physical merchant, whereas the environment determined based on the video feed is an outdoors environment, which is inconsistent with the indoors environment of the retail merchant. The fraud detection server system may determine that the suspected fraudulent transaction is fraudulent based on an environment determined based on a video feed and an environment of the transaction in various other manners as well.

At step 614, and based on the determination that the transaction is fraudulent, the fraud detection server system may cancel the transaction. The fraud detection server system may take other actions based determining that a suspected transaction is fraudulent. As some examples, the fraud detection server system may notify the user that the suspected fraudulent transaction has been canceled. The fraud detection server system may take various other actions as well, such as locking a user's credit card until confirmation is received that the suspected transaction is non-fraudulent.

It will be appreciated that the methods, algorithms, and processes described above may be performed or combined in a variety of ways as part of performing a fraud detection process. These combinations may result in fewer fraudulent transactions, more accurately identifying fraudulent transactions, and/or fewer false positive fraudulent transactions.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   determining, based on a transaction record for a transaction comprising merchant category information, a predetermined list of objects associated with merchant category information and an environment associated with the transaction record;
   determining, from a video feed of an augmented reality (AR) device associated with the transaction conducted by a user, one or more objects in the video feed that are associated with the transaction;
   providing a representation of the merchant category information associated with the environment, the predetermined list of objects and the one or more objects in the video feed as inputs to a machine classifier;
   receiving, as output from the machine classifier, a likelihood that the user is located in the environment associated with the transaction record; and
   based on the likelihood exceeding a threshold value, allowing the transaction to proceed.

2. The method of claim 1, wherein the determining the environment associated with the transaction record is further based on the predetermined list of objects associated with merchant category information.

3. The method of claim 1, wherein the machine classifier is trained based on a training historical video feed comprising:
   a pre-labeled environment associated with a scene in the training historical video feed; and
   a plurality of training objects appearing in the scene.

4. The method of claim 1, the likelihood that the user is located in the environment of the transaction record further comprises:
   determining a scene from the video feed,
   wherein determining the likelihood that the user is located at the environment associated with the transaction record further comprises determining that the scene from the video feed is associated with the environment.

5. The method of claim 4, further comprising:
   determining location data associated with the user; and
   wherein determining the scene from the video feed is based on the location data associated with the user.

6. The method of claim 4, wherein the determining the scene from the video feed is associated with the environment comprises:
   determining, using a scene detection neural network, that the scene from the video feed is associated with the environment.

7. The method of claim 1, further comprising:
   identifying the one or more objects from the video feed; and
   determining whether the identified one or more objects are associated with the environment based on a comparison of the identified one or more objects with the predetermined list of objects,
   wherein allowing the transaction to proceed is further based on determining that a quantity of identified objects, matching the predetermined list of objects, has exceeded a predetermined threshold value.

8. The method of claim 1, wherein the one or more objects comprise text, and wherein the method further comprises:
   recognizing the text via optical character recognition (OCR) or natural language processing (NLP); and
   determining whether the recognized text is consistent with the environment of the transaction record.

9. The method of claim 1, further comprising:
   sending, to the AR device or a computing device associated with the user, a message requesting that the user capture verification video with the AR device,
   wherein allowing the transaction to proceed is further based on a receipt of the verification video.

10. The method of claim 1, further comprising:
    sending, to the AR device or a computing device associated with the user, a message requesting that the user perform a verification action with the AR device,
    wherein allowing the transaction to proceed is further based on that the user has performed the verification action in the video feed.

11. The method of claim 10, wherein the verification action comprises at least one of a gesture, or an action to point the AR device to an object that is a surrounding of the user.

12. The method of claim 1, wherein the video feed comprises a historical video feed that was captured at a time of the transaction.

13. A fraud detection system comprising:
    one or more processors; and
    a memory storing instructions thereon that, when executed by the one or more processors, cause the fraud detection system to:
      obtain permission to access a video feed from an augmented reality (AR) device associated with a user;
      determine, based on a transaction record comprising merchant category information, a predetermined list of objects associated with the merchant category information and an environment associated with a transaction of the transaction record;
      after obtaining the permission, determine, from the video feed, one or more objects in the video feed that are associated with the transaction conducted by the user;
      provide a representation of the merchant category information associated with the environment, the predetermined list of objects and the one or more objects in the video feed as inputs to a machine classifier; and
      receive, as output from the machine classifier, a likelihood that the user is located in the environment associated with the transaction; and
      determine, based on the likelihood not exceeding a threshold value, to cancel the transaction.

14. The fraud detection system of claim 13, further comprising instructions that, when executed by the one or more processors, cause the fraud detection system to:
    determine the environment associated with the transaction record further based on the predetermined list of objects associated with merchant category information.

15. The fraud detection system of claim 13, further comprising instructions that, when executed by the one or more processors, cause the fraud detection system to:
    train the machine classifier based on a training historical video feed comprising:
      a pre-labeled environment associated with a scene in the training historical video feed; and
      a plurality of training objects appearing in the scene.

16. The fraud detection system of claim 13, further comprising instructions that, when executed by the one or more processors, cause the fraud detection system to:
    determine a scene from the video feed; and determine the likelihood that the user is located at the environment associated with the transaction record by determining that the scene from the video feed is associated with the environment.

17. The fraud detection system of claim 13, further comprising instructions that, when executed by the one or more processors, cause the fraud detection system to:
  identify the one or more objects from the video feed;
  determine whether the identified one or more objects are associated with the environment based on a comparison of the identified one or more objects with the predetermined list of objects; and
  cancel the transaction is further based on determining that a quantity of identified objects, matching the predetermined list of objects, has fallen below a predetermined threshold value.

18. The fraud detection system of claim 13, further comprising instructions that, when executed by the one or more processors, cause the fraud detection system to:
  send, to the AR device or a computing device associated with the user, a message requesting that the user perform a verification action with the AR device; and
  cancel the transaction based on that the user has not performed the verification action in the video feed.

19. The fraud detection system of claim 18, wherein the verification action comprises at least one of a gesture, or an action to point the AR device to an object that is a surrounding of the user.

20. A non-transitory computer-readable storage medium storing instructions that, when executed, cause at least one processor to:
  identify a transaction associated with a user that is suspected to be fraudulent;
  obtain permission to access a video feed from an augmented reality (AR) device associated with the user;
  determine, based on a transaction record of the transaction comprising merchant category information, a predetermined list of objects associated with the merchant category information and an environment associated with the transaction of the transaction record;
  after obtaining the permission, determine, from the video feed, one or more objects in the video feed that are associated with the transaction conducted by the user;
  provide a representation of the merchant category information associated with the environment, the predetermined list of objects and the one or more objects in the video feed as inputs to a machine classifier; and
  receive, as output from the machine classifier, a likelihood that the user is located in the environment associated with the transaction; and
  determine, based on the likelihood not exceeding a threshold value, to cancel the transaction.

* * * * *